United States Patent
Heidasch et al.

(10) Patent No.: US 9,223,777 B2
(45) Date of Patent: *Dec. 29, 2015

(54) SELF-LEARNING SEMANTIC SEARCH ENGINE

(71) Applicants: SAP SE, Walldorf (DE); intelligent views gmbh, Darmstadt (DE)

(72) Inventors: Robert Heidasch, Speyer (DE); Stefan Scheidl, Speyer (DE); Klaus Reichenberger, Frankfurt (DE); Steffen Moldaner, Riedstadt (DE); Archim Heimann, Wiesloch (DE); Stephan Brand, Wiesloch (DE); Nico Licht, Heidelberg (DE); Michael Neumann, Speyer (DE); Christoph Meinel, Heidelberg (DE)

(73) Assignees: SAP SE, Walldorf (DE); intelligent views gmbh, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/536,040

(22) Filed: Nov. 7, 2014

(65) Prior Publication Data

US 2015/0058315 A1 Feb. 26, 2015

Related U.S. Application Data

(63) Continuation of application No. 13/217,732, filed on Aug. 25, 2011, now Pat. No. 8,935,230.

(51) Int. Cl.
*G06F 17/30* (2006.01)
*G06F 17/27* (2006.01)
*G06N 99/00* (2010.01)

(52) U.S. Cl.
CPC ........ *G06F 17/2785* (2013.01); *G06F 17/3053* (2013.01); *G06F 17/30321* (2013.01); *G06F 17/30864* (2013.01); *G06N 99/005* (2013.01)

(58) Field of Classification Search
CPC .................................................. G06F 17/30336
USPC ....................................................... 707/711
See application file for complete search history.

(56) References Cited

U.S. PATENT DOCUMENTS

| | | | |
|---|---|---|---|
| 4,661,924 | A | 4/1987 | Okamoto et al. |
| 5,995,920 | A | 11/1999 | Carbonell et al. |
| 6,163,785 | A | 12/2000 | Carbonell et al. |
| 6,519,586 | B2 | 2/2003 | Anick et al. |

(Continued)

FOREIGN PATENT DOCUMENTS

| | | |
|---|---|---|
| WO | 02/10980 | 2/2002 |
| WO | 2006124952 | 11/2006 |

OTHER PUBLICATIONS

European Search Report for EP 12 00 3993, dated Jul. 23, 2012.

(Continued)

*Primary Examiner* — Noosha Arjomandi
(74) *Attorney, Agent, or Firm* — Kenyon & Kenyon LLP (57) ABSTRACT

A method, machine readable storage medium, and system for providing a self learning semantic search engine. A semantic network may be set up with initial configuration. A search engine coupled to the semantic network may build indexes and semantic indexes. A user request for business data may be received. The search engine may be accessed via a semantic dispatcher. And based on the access, search engine may update the indexes and semantic indexes.

20 Claims, 3 Drawing Sheets

(56) References Cited

U.S. PATENT DOCUMENTS

| | | |
|---|---|---|
| 6,996,520 B2 | 2/2006 | Levin |
| 7,051,023 B2 | 5/2006 | Kapur et al. |
| 7,107,264 B2 | 9/2006 | Lu |
| 7,383,172 B1 | 6/2008 | Jamieson |
| 7,580,831 B2 | 8/2009 | Haskell et al. |
| 7,702,647 B2 | 4/2010 | Uceda-Sosa |
| 7,711,689 B2 | 5/2010 | Kim |
| 7,774,404 B2 | 8/2010 | Heidasch |
| 7,865,358 B2 | 1/2011 | Green et al. |
| 7,870,117 B1* | 1/2011 | Rennison .................. 707/706 |
| 7,895,032 B2 | 2/2011 | Mullen |
| 7,958,074 B2 | 6/2011 | Uceda-Sosa |
| 8,156,473 B2 | 4/2012 | Heidasch |
| 8,180,754 B1 | 5/2012 | Ershov |
| 8,205,120 B2 | 6/2012 | Heidasch et al. |
| 8,239,839 B2 | 8/2012 | Rossmann et al. |
| 8,335,314 B2 | 12/2012 | Heidasch |
| 8,335,754 B2 | 12/2012 | Dawson et al. |
| 2003/0130976 A1 | 7/2003 | Au |
| 2004/0044548 A1 | 3/2004 | Marshall et al. |
| 2005/0080613 A1 | 4/2005 | Colledge et al. |
| 2006/0085181 A1 | 4/2006 | Komamura et al. |
| 2006/0143564 A1 | 6/2006 | Bates et al. |
| 2006/0217964 A1 | 9/2006 | Kamatani et al. |
| 2007/0016563 A1 | 1/2007 | Omoigui |
| 2007/0156677 A1 | 7/2007 | Szabo |
| 2007/0226242 A1 | 9/2007 | Wang et al. |
| 2007/0255702 A1 | 11/2007 | Orme |
| 2007/0277164 A1 | 11/2007 | Nandakumaraiah |
| 2007/0294200 A1 | 12/2007 | Au |
| 2008/0021698 A1 | 1/2008 | Itoh et al. |
| 2008/0086465 A1 | 4/2008 | Fontenot et al. |
| 2008/0097748 A1 | 4/2008 | Haley et al. |
| 2008/0147646 A1 | 6/2008 | Jaschek et al. |
| 2008/0167858 A1 | 7/2008 | Christie et al. |
| 2008/0243480 A1* | 10/2008 | Bartz et al. .................. 704/9 |
| 2008/0281810 A1 | 11/2008 | Smyth et al. |
| 2008/0294982 A1 | 11/2008 | Leung et al. |
| 2008/0301174 A1* | 12/2008 | Mons ............... G06F 17/30731 1/1 |
| 2009/0019002 A1 | 1/2009 | Boulis |
| 2009/0177463 A1 | 7/2009 | Gallagher et al. |
| 2009/0216696 A1 | 8/2009 | Downs et al. |
| 2009/0292700 A1 | 11/2009 | Castellani et al. |
| 2010/0077001 A1* | 3/2010 | Vogel ............... G06F 17/30707 707/777 |
| 2010/0131900 A1 | 5/2010 | Spetalnick |
| 2010/0174675 A1* | 7/2010 | Mons ............... G06F 17/30616 707/603 |
| 2010/0174730 A1* | 7/2010 | Leung ............... G06F 17/30522 707/758 |
| 2010/0268702 A1 | 10/2010 | Wissner et al. |
| 2010/0286979 A1 | 11/2010 | Zangvil et al. |
| 2011/0022798 A1 | 1/2011 | Hou et al. |
| 2011/0078205 A1 | 3/2011 | Salkeld et al. |
| 2011/0213804 A1* | 9/2011 | Lee et al. .................. 707/776 |
| 2011/0225139 A1 | 9/2011 | Wang et al. |
| 2011/0257963 A1 | 10/2011 | Zuev et al. |
| 2011/0264697 A1* | 10/2011 | Latzina et al. ............. 707/771 |
| 2013/0046544 A1 | 2/2013 | Kay et al. |
| 2013/0054589 A1* | 2/2013 | Cheslow ........... G06F 17/30684 707/728 |
| 2013/0067430 A1* | 3/2013 | Mayer-Ullmann ........... 717/106 |
| 2013/0073546 A1* | 3/2013 | Yan et al. .................. 707/732 |

OTHER PUBLICATIONS

European Search Report for EP 12 00 4745, dated Mar. 28, 2013.
Ahu Sieg et al., "Web search personalization with ontological user profiles", Proceedings of the sixteenth ACM Conference on Conference on Information and Knowledge Management, CIKM '07, Jan. 1, 2007, pp. 525-534, XP050048869.
Satoshi Sekine et al., "Acquiring ontological knowledge from query logs," WWW 2007/Track: Data Mining, Jan. 1, 2007, XP055101168, pp. 1223-1224.
Office Action dated Feb. 21, 2014 issued in corresponding EP Application No. 12003993.8.

* cited by examiner

SELF-LEARNING SEMANTIC SEARCH ENGINE

CROSS-REFERENCE TO RELATED APPLICATIONS

This application is a continuation of, and claims priority to, U.S. patent application Ser. No. 13/217,732, filed on Aug. 25, 2011, which is hereby incorporated by reference in its entirety. This application is also related to commonly-assigned U.S. patent applications: Ser. No. 13/050,092, entitled BUSINESS SEMANTIC NETWORK BUILDER, filed Mar. 17, 2011; Ser. No. 13/050,333, entitled SEMANTIC PHRASE SUGGESTION ENGINE, filed Mar. 17, 2011; Ser. No. 13/149,036, entitled SEMANTIC TERMINOLOGY IMPORTER; filed May 31, 2011. The contents of all these applications are incorporated herein by reference in their entirety.

BACKGROUND

Business software applications, for example, Enterprise Resource Planning (ERP), Customer Relationship Management (CRM), and Knowledge Management (KM), typically stores information in data stores. The data stores include local databases, and distributed storage such as Lightweight Directory Access Protocol (LDAP), Web-based Distributed Authoring and Versioning (WebDAV), file sharing, etc. One difficulty faced by enterprise business software users is searching business data in the data stores.

Typically, users input search terms. These search terms are defined as words in some order or relation. This means that selected words and their order should play a significant role in determining the search result. However, the existing search machines have difficulties in context-related search because the search terms are interpreted by a search machine as a string/term and are very often taken without context. For example, an existing search machine looking for a "Lotus" term would generate hits for flower, car and brand of car oil, although in reality these hits have nothing in common and are defined in completely different context (e.g., domain of knowledge).

One of the solutions used to model the knowledge is a semantic network. The semantic network allows grouping the knowledge in domains and organizes terminology in concepts that group the semantic related terms (e.g., synonyms). In the semantic network, each term is described by metadata—so-called term types. The existing search engines, such as those Internet based search engines or search engines provided by the business software vendors, however can only search the user input search terms (words, sentences) without contextual analysis or with only partial contextual analysis. Thus, the existing solution does not support the integration of business-related content and business rules in the search and/or distribution of business knowledge. Further, the existing solution does not reuse any semantic knowledge (e.g., terminology defined in semantic net), such as user/user-group knowledge or importance of the terminology.

Accordingly, there is a need in the art to provide a self-learning semantic search engine that reuses the semantic knowledge, includes user/user-group knowledge to provide better user/user-group-oriented search results and influences the terminology ranking (terminology importance) into indexing process (e.g., including semantic-related information).

DETAILED DESCRIPTION

Embodiments of the present invention may provide a smooth integration with existing business applications. For example, any business context may be determined by business object (BO) definition and user semantic context may be determined by user business roles, e.g. assignment to user-groups and roles. All information may be integrated with a semantic network that allows defining the terms in a context-sensitive way. The smooth integration of the search terminology analysis, user context (e.g. preferences, business roles, etc.) and self learning processes extend from the existing technology.

Embodiments of the present invention may use domain-specific and user-oriented business terminology to build lexicons and then semantic indexes. Any new terms, detected during analyzing existing documents/business data may be used to build new terminology. Also, the smooth component integration allows learning from the user interactions which allows creation of optimized user-oriented "knowledge views". For example, when a user uses terms searching for documents/data in business area, works with documents/data), the system uses this information to create user preferences (business-related user context) as part of semantic indexes. Thus, embodiments of the present invention may provide a better understanding of business user needs by providing more precise business information when a user searches for documents (unstructured business data) or business data (result is grouped using domain/context information), or starts business applications/transactions, etc. Further, embodiments of the present invention may be used to build/provide to the business user an intelligent application that helps to better consume business terminology and data that is spread out in a whole company.

Embodiments provide a method for providing a self learning semantic search engine. An exemplary method may include setting up initial configuration for a semantic network. A search engine coupled to the semantic network may build indexes and semantic indexes. A user request for business data may be received. The search engine may be accessed via a semantic dispatcher. And based on the access, the search engine may update the indexes and semantic indexes.

Embodiments may also provide a machine readable storage medium embodied with computer instructions for causing a processor to execute a process for providing a self learning semantic search engine. The processor may set up an initial configuration for a semantic network. A search engine coupled to the semantic network may build indexes and semantic indexes. A user request for business data may be received. The search engine may be accessed via a semantic dispatcher. And based on the access, the search engine may update the indexes and semantic indexes.

A system for providing a self learning semantic search engine may include a database, a user input-output device, and a processor. The database may store business data related to an enterprise. A user input-output device may be coupled to the database. The processor may be responsive to inputs from the user input device and coupled to the database. The processor may be further configured to perform process steps to provide the self learning semantic search engine. The processor may set up initial configuration for a semantic network. A search engine coupled to the semantic network may build indexes and semantic indexes. A user request for business data may be received. The search engine may be accessed via a semantic dispatcher. And based on the access, the search engine may update the indexes and semantic indexes.

Figure 1:
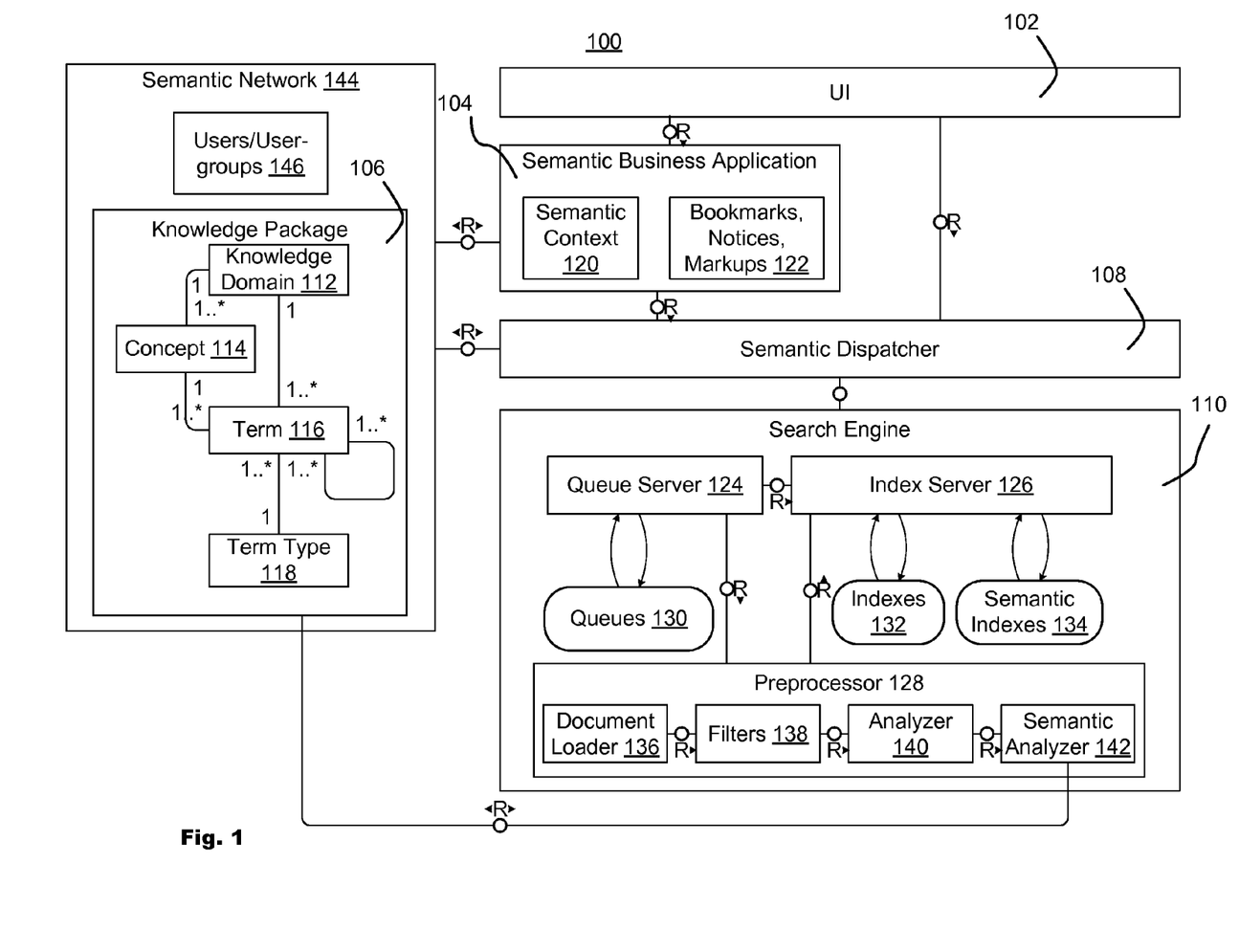
FIG. 1 illustrates a block diagram of a system for providing a self-learning semantic search according to an embodiment of the present invention.

FIG. 1 illustrates a block diagram of a system 100 for providing a self-learning semantic solution according to an embodiment of the present invention. The system may comprise a user interface (UI) 102, a semantic business application 104, a semantic network 144, a semantic dispatcher 108 and a search engine 110.

The UI 102 may be any client UI, such as desktop application UI or HTML based UI that include any rich-client application (e.g., Microsoft Silverlight, Adobe Flash, mobile, etc.). The UI may receive user credentials to identify any roles or user-groups the user may belong to and user interactions (e.g., documents worked on, search preferences, etc.) An end user through the UI 102 may work with the semantic business application 104 (e.g., the UI 102 provide a web portal for the semantic business application 104) or call the search engine 110 directly via the semantic dispatcher 108 (e.g., the UI 102 provide a web portal for the search engine 110).

The semantic network 144 may include a users/user-groups block 146 and a knowledge package 106. The semantic network 144 may include definitions for semantic relations among terms (e.g., concepts). The semantic network 144 may be used as a form of knowledge representation, and therefore may be used to model business knowledge in companies and their various parts, e.g. as enterprise knowledge and/or terminology. The knowledge package 106 may include one or more knowledge domains 112. Each knowledge domain 112 may include one or more concepts 114, one or more terms 116, and one or more term types 118. The concept 114 and term 116 may provide terminology definition. A plurality of terms 116 may be collected and defined (e.g., as in a word list) to provide a common repository of terms used by various users. Each term 116 may be assigned to a term type 118, for example, a grammar-related definition of type, which may be provided by the grammatical sentence definition (e.g., noun, verb, adjective, etc.). The term type 116 may also define the usage of an associated term 116 that allows for classification of the term.

In one embodiment, each term 116 may have an associated importance indicator that defines how many times the term 116 may be used by all users, user-groups, and any/each particular user or user-group (e.g., various user groups defined in the users/user-groups 146). The importance indicator may indicate knowledge importance for a particular user or user-group (e.g., a terminology frequently used by a user or user-group is more important to this user or user-group). Also, if a term is very often used by end-user (e.g., special term in some business area), it may automatically influence importance of the document that extensively uses it. The importance indicator for a term 116 may be updated when the term 116 may be used by any end-user during operation. In one embodiment, users and user-groups 146 may be assigned to roles and the roles may be assigned to business objects (BO—encapsulated business functionality) and the BO may be assigned to knowledge domains 112. Thus, the importance indicator may be associated with roles.

In one embodiment, there may be different knowledge domains 112. For example, "Lotus" can be a car, a brand of oil or a flower thus there may be at least different domains for cars, oil, flowers, respectively. The knowledge domains 112 may be ordered hierarchically, which allows for knowledge grouping, e.g. the first two meanings may belong to similar knowledge groups, and the last one has nothing in common and is defined in a completely different context/knowledge group (e.g., as a flower).

In one embodiment, the semantic network 144 may be constructed with the help of existing business objects provided by the modern business applications. Those business objects may be an ideal source of terminology since they may group or encapsulate the definition of relevant business content information and may provide the definition of terms and also relevant metadata.

The semantic business application 104 may be an exemplary business application that allows building business and user context. The semantic business application 104 may include a semantic context 120 for building business and user context and bookmarks, notices, markups 122 to track user/group-specific usage of business data (e.g., via creation of bookmarks, notices, markups to existing business content or manipulation of business data (transactions, etc.)). The semantic business application 104 may be any business applications (e.g., ERP, CRM, SCM, etc.) The semantic dispatcher 108 may be a semantic sensitive dispatcher that uses user data (business roles, preferences), semantic terminology and its assignment to business objects and/or functionality to provide better access to business content provided by the search engine 110.

The search engine 110 may include a queue server 124, an index server 126 and a preprocessor 128. The queue server 124 may build and maintain a plurality of queues 130 to support interval- and queue-based control of asynchronous indexing of documents. The index server 126 may build and maintain a plurality of indexes 132 and a plurality of semantic indexes 134. The index server 126 may perform, for example, exact, error tolerant, linguistic, Boolean and phrase searches. Additionally, the index server 126 may allow searching in document attributes and searching for similar documents using extraction of words and usage of classification. In one embodiment, the search engine 110 be a memory based search engine or any type of search engine. The search engine 110 may use terminology from the semantic network 144 to build terminology lexicon (additional data for the analyzer 140 and semantic analyzer 142 in the preprocessor 128) and to build semantic indexes 134.

The preprocessor 128 may include a document loader 136, a plurality of filters 138, an analyzer 140 and a semantic analyzer 142. The preprocessor 128 may be used for the text documents to prepare documents for the linguistic analysis, perform linguistic analysis and forward the results to the index server. The document loader 136 may load the document (e.g., from file systems, databases, network storage or Internet) into the preprocessor 128. The filters 138 may filter the loaded documents and convert the document from a different format (e.g., Word document, Adobe PDF, etc.) to standard representation (Unicode format UTF-8). The analyzer 140 may identify key words from the analyzed document and send the analysis to the index server 126 to build indexes 132. The semantic analyzer 142 may perform linguistic analysis using user defined lexicon (e.g., the concept 114 and/or term 116 of the knowledge package 106) and send the linguistic analysis result to the index server 126 to build the semantic indexes 134. The semantic indexes 134 may thus include context related information, such as, preferences based on user/user-groups (or roles) and also the term importance indicators.

Thus, in one embodiment, the semantic network 144 and search engine 110 may be smoothly integrated with the semantic business application 104 to provide much better user-oriented business data, for example, linguistic analysis of search terminology, user context (e.g., preferences, business roles, etc.) and self learning processes to extend any current solution. The semantic business application 104 may be any ERP, CRM, KM enterprise software applications.

Any existing enterprise business terminology may be incorporated into the semantic network 144 (for example, using the techniques described in the utility application Ser. No. 13/050,092, entitled "BUSINESS SEMANTIC NETWORK BUILDER") and used to build lexicons (e.g., used by the semantic analyzer 142 of the preprocessor 128 to build semantic indexes 134). In one embodiment, the existing enterprise terminology may be imported into the semantic network 144 to simplify the initial configuration. Additionally, the smooth component integration may allow creation of optimized user-oriented "knowledge views". That is, user may get the information related to his business activity upfront (e.g., the first page of display of search result). This may be supported by building of user/user-group preference indexes as part of the semantic indexes 134. Moreover, this infrastructure may be used to build and/or provide to the business user an intelligent business application that helps to better consume business terminology/data which may be spread out in a whole company (for example, see the utility application Ser. No. 13/050,333, entitled "SEMANTIC PHRASE SUGGESTION ENGINE").

Once the existing business terminology may be incorporated in the semantic network 144, the terminology may be used to build lexicons that are used to build semantic indexes 134. For example, the preprocessor 128 may use this information to build the indexes 132 that are optimized for usage of concepts and terms (synonyms, etc.) and complex term phrases (e.g. "Latin America", LATAM, etc.) and also to build the semantic indexes 134 that include relations in document and relations between terms (e.g., synonyms for each term in different context). In one embodiment, the semantic indexes 134 may provide results that do not contain the search term but contain synonyms, for example, most used synonyms.

When end-user use the system 100 by interacting with the UI 102 (e.g., either via the semantic business application 104 or call directly to the search engine 110 (both though the semantic dispatcher 108)), the system 100 may obtain business rules from user management (e.g., users/user-groups 146) and/or business applications and build business-related user context in the semantic network 144 (user assigned to groups or roles assigned to knowledge domains). This knowledge may then be used to build the semantic indexes 134 in the search engine 110 (e.g., user/user-group preference indexes as part of the semantic indexes 134). In one embodiment, a search performed by the search engine 110 may take into account user-groups the user belongs to or roles of the user within an organization, and thus, the system 100 may provide results that do not contain the search term but most used synonyms by the user or user-group in a particular context.

Therefore, in one embodiment, data stored in the semantic network 144 and semantic indexes 134 may be used to improve access and understanding of existing information. So that when any end-user consumes this data and works with it (e.g., accessing the data via the semantic business application 104 or any business application coupled to the search engine 110 and semantic network 144 in a business application specific context). The access (consumption and/or work) of data may generate more context-related information associated with the data to be improve the index 132 and semantic indexes 134. Thus, in this situation, the system 100 may build a cyclic dependency for the context sensitive data and may learn from any existing knowledge, user interactions and business relations (e.g., roles).

In one embodiment, all components of the system 100 may be integrated and report data to a highly optimized network which reflects the terminology dependency, its usage in user/group and context related manner. The highly optimized network may be a network that defines optimized queries. The highly optimized network may allow fast access to the network as compared to other queries that cause a time consuming information calculation.

In one embodiment, the search engine 110 may be divided into knowledge oriented modules and the semantic dispatcher 108 may use the context information to optimize access to data (e.g., context information may be used to optimize dispatching of request to right search engine module that provides required information). Further, the search engine 110 may use the context information to provide data that does not contain the search term but contain synonyms (e.g., used by people knowledgeable in a particular field or used in particular context). The system 100 may provide a smooth integration of the search terminology analysis, user context (e.g., preferences, business roles, etc.) and self learning processes.

The system 100 may use any domain-specific and user-oriented business terminology to build lexicons (e.g., used by the semantic analyzer 142 of the preprocessor 128 to build semantic indexes 134). Further, any new terms detected during analysis of existing documents or business data may be used to build new terminology. For example, as described above, when a user uses terms to search documents or data in business area, and works with documents or data, the system 100 may use this information to create user preferences (business-related user context). The user preferences may then influence building of user or user-group preference indexes as part of the semantic indexes 134.

In one embodiment, the system 100 may provide a search engine that has a better understanding of business user needs by providing more precise business information, for example, when a user search for documents (unstructured business data) and/or business data (result may be grouped using domain/context information) or start business applications/transactions, etc.

Figure 2:
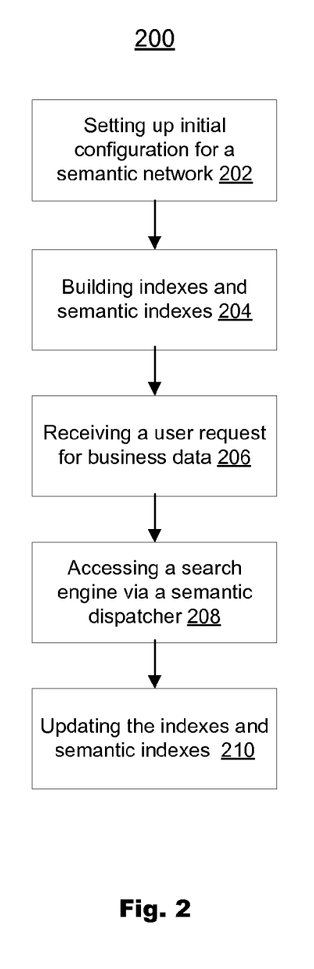
FIG. 2 illustrates an exemplary method for building a self-learning semantic search engine according to an embodiment of the present invention.

FIG. 2 illustrates an exemplary method 200 for building a self-learning semantic search engine according to an embodiment of the present invention. A computer processor may be configured to execute program instructions to perform the method 200. At step 202, initial configuration for a semantic network may be set up. For example, an initial configuration may be created by an end user or provided by software application provider (e.g., business software vendors). The business software provided by venders may include a lot of already defined business objects. The initial configuration may include terminologies for business object definitions and global data type definitions that may be extracted from existing business objects and imported into a semantic network (e.g., the semantic network 144 of FIG. 1). The semantic network may establish concepts, terms, term types and initial set of knowledge domains based on relationship mapping between source structures (business computer objects, the business computer object's elements, and search sources and the search source's elements) and target elements and respective assignment/link conditions (simple assignment and/or relation model).

After the semantic network has been set up, at step 204, the method 200 may build indexes and semantic indexes. The indexes and semantic indexes may be built from existing business documents. For example, a preprocessor (e.g., the preprocessor 128 of FIG. 1) may load the documents, filter documents, analyze the terms contained inside the documents to build the indexes for terms and use semantic analyzer to may perform linguistic analysis using to build the semantic indexes.

At step 206, the method 200 may receive a search request for business data at a UI entered by a user. The UI may be a desktop application UI or web based UI (e.g., the UI 102 of FIG. 1). The search request may be routed, at step 208, via a semantic dispatcher to access a search engine. As described above, the search request may be directly routed from the UI to the semantic dispatcher or via a semantic business application (e.g., the semantic business application 104 of FIG. 1). The semantic dispatcher may be a semantic sensitive dispatcher that uses user data (business roles, preferences), semantic terminology and its assignment to business objects and/or functionality to provide better access to business content provided by the search engine (e.g., the semantic dispatcher 108 of FIG. 1).

Then, at step 210, the search engine may update the indexes and semantic indexes. For example, the indexes may be updated for existing terms and their importance. The semantic indexes may be updated by user-context information and association to the searched terms. Moreover, new terms (e.g., synonyms) may be created with user context information and importance indicator for any searched terms may be updated (e.g., to reflect user or role preference).

In one embodiment, a terminology administrator, for example, a person that may be responsible for administering the semantic knowledge (e.g., the terminology in semantic network) can verify the terminology definition and modify the term definition (e.g., add related terms) to update indexes and semantic indexes. The terminology administrator can be used as a convenient tool to build links, e.g. usage of external terminology definition (e.g., third-party definition—lexicons), and to propose related terms.

Figure 3:
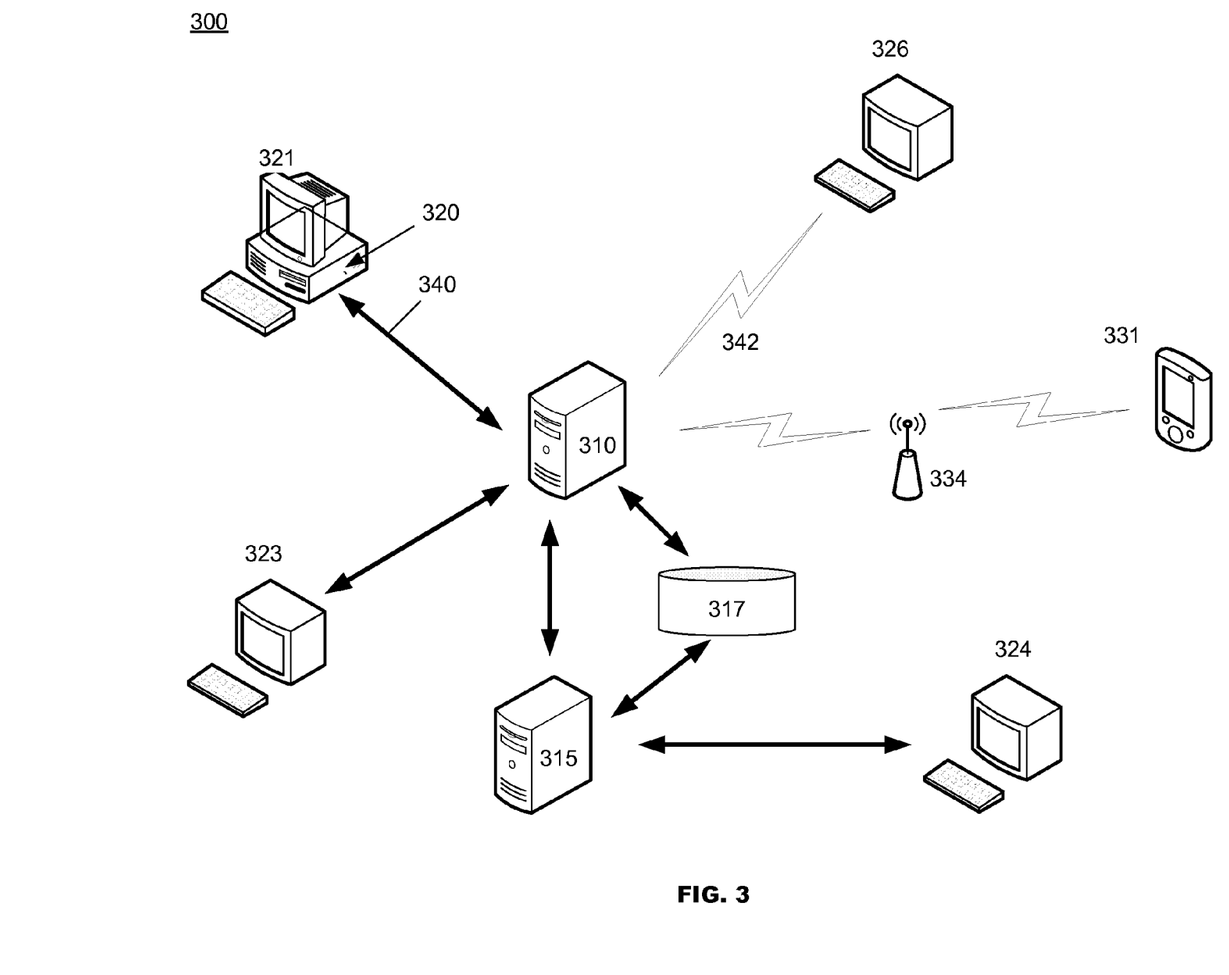
FIG. 3 illustrates an exemplary hardware configuration for implementing a system according to an embodiment of the present invention.

FIG. 3 illustrates an exemplary hardware configuration for implementing a system according to an embodiment of the present invention. The system 300 may comprise one or more networked servers 310 and 315, one or more client terminals 321, 323, 324 and 326, data storage devices 317, wired and wireless communication links 340 and 342, wireless access point 334, and a portable device(s) 331. The one or more networked servers 310 and 315 may execute a multi-application software system. The servers 310 and 315 may include processor(s), internal memory and related computer program instructions (all not shown).

The server 310 and/or 315 may execute on a processor a search engine program (as described with respect to FIG. 1) that facilitates provision of a self-learning semantic search engine system including data communications and transfers between the networked servers 310 and 315, and the client terminals 321, 323, 324 and 326, and/or portable device(s) 331 over wired or wireless communication paths. The server 310 may access data storage device(s) 317 that store machine-readable software instructions that may be accessed and executed by the processor(s) of the server 310.

The data storage device(s) 317 also may store data related to the operation of an enterprise including generated by the search engine and the semantic network interpreter. The data storage device 317 that may be a hard disk drive, non-volatile memory, flash memory, or any suitable device for storing electronic data, and may be organized as a object-oriented or relational database. The data storage may maintain hierarchical data structures containing information related to a variety of different business functions of an enterprise. For example, in a human resources environment, department staffing including headcount, projected growth, and attrition, employee profiles and salary information, key positions and employee performance, and the like may be maintained. Or, in an accounting environment, invoicing, accounts due, accounts payable, projected revenue and the like may be maintained.

The servers 310 and 315 may communicate with client terminal(s) 321, 323, 324, 326 and portable device(s) 331 via network connections 340 and 342. The client terminals 321, 323, 324 and 326 may include a processor, display device, and data storage device, such as a hard disk (all not shown). The client terminals 321, 323, 324 and 326 may participate in execution of program instructions. The portable device 331 may be a smartphone, personal digital assistant, tablet, notebook or mini-notebook computer capable of wired and/or wireless communication. The portable device 331 may include memory, a processor, input device, display, and devices that enable wired or wireless communication.

The number of servers, number of clients and topology of the network connections between them are immaterial to the present discussion unless otherwise noted. For example, in a human resources environment, department staffing including headcount, projected growth, and attrition, employee profiles and salary information, key positions and employee performance, and the like may be maintained. Or, in an accounting environment, invoicing, accounts due, accounts payable, projected revenue and the like may be maintained.

The exemplary method and computer program instructions may be embodied on a machine readable storage medium such as a computer disc, optically-readable media, magnetic media, hard drives, RAID storage device, and flash memory. In addition, a server or a database server may include machine readable media configured to store machine executable program instructions. The features of the disclosed embodiments may be implemented in hardware, software, firmware, or a combination thereof and utilized in systems, subsystems, components or subcomponents thereof. When implemented in software, the elements of the disclosed embodiments are programs or the code segments used to perform the necessary tasks. The program or code segments can be stored on machine readable storage media. The "machine readable storage media" may include any medium that can store information. Examples of a machine readable storage medium may include electronic circuits, semiconductor memory device, ROM, flash memory, erasable ROM (EROM), floppy diskette, CD-ROM, optical disk, hard disk, fiber optic medium, any electromagnetic storage device, or optical. The code segments may be downloaded via computer networks such as Internet, Intranet, etc. The disclosed embodiments may be used in a semantic business application solution to support context-related search in SAP business applications (e.g., SAP ERP, SAP CRM, etc.) and/or non-SAP systems. The business knowledge provided by a semantic network can be used by all business applications, e.g. as a semantic extension.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the sprit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for providing a self-learning semantic search engine, comprising:
    setting up, by a computer processor, an initial configuration for a semantic network;
    building, by the processor, indexes and semantic indexes in a search engine coupled to the semantic network, wherein the indexes indicate terms included in the at least one document and the semantic indexes include at least one concept defining a semantic relation between at least two terms of the at least one document;
    receiving, by the processor, a request for business data;
    updating, by the processor:
        the indexes and
        the semantic indexes by adjusting a ranking of an existing term based on context information derived from the request;
    retrieving a document from the search engine that matches the request;
    receiving markups or bookmarks for the document; and
    updating indexes and semantic indexes with the user markups or bookmarks.

2. The method of claim 1, wherein the initial configuration for the semantic network is received from a user.

3. The method of claim 1, wherein the initial configuration for the semantic network is extracted from existing business objects.

4. The method of claim 1, wherein the semantic indexes includes at least one of: user preferences information based on user roles; synonyms for business terms based on user roles; indicators indicating importance of business terms based on user roles.

5. The method of claim 1, wherein the semantic dispatcher dispatches the request for business data based on user's business roles, semantic terminology and business objects assigned to the semantic terminology.

6. The method of claim 1, wherein the context information derived from the request includes a relationship to a term derived from the request.

7. The method of claim 1, wherein the updating of the indexes and semantic indexes of the semantic search engine includes reusing semantic knowledge.

8. The method of claim 1, wherein the updating of the indexes and semantic indexes of the semantic search engine includes reusing terminology defined in a configuration of the semantic network to influence an importance of business terminology.

9. A non-transitory machine readable storage medium embodied with computer instructions for causing a processor to execute a process for building a self-learning semantic search engine, the process comprising:
    setting up an initial configuration for a semantic network;
    building indexes and semantic indexes in a search engine coupled to the semantic network, wherein the indexes indicate terms included in the at least one document and the semantic indexes include at least one concept defining a semantic relation between at least two terms of the at least one document;
    receiving a request for business data;
    updating, by the processor:
        the indexes and
        the semantic indexes by adjusting a ranking of an existing term based on context information derived from the request;
    retrieving a document from the search engine that matches the request;
    receiving markups or bookmarks for the document; and
    updating indexes and semantic indexes with the user markups or bookmarks.

10. The non-transitory machine readable storage medium of claim 9, wherein the initial configuration for the semantic network is received from a user.

11. The non-transitory machine readable storage medium of claim 9, wherein the initial configuration for the semantic network is extracted from existing business objects.

12. The non-transitory machine readable storage medium of claim 9, wherein the semantic indexes includes at least one of: user preferences information based on user roles; synonyms for business terms based on user roles; indicators indicating importance of business terms based on user roles.

13. The non-transitory machine readable storage medium of claim 9, wherein the semantic dispatcher dispatches the request for business data based on user's business roles, semantic terminology and business objects assigned to the semantic terminology.

14. The non-transitory machine readable storage medium of claim 9, wherein the context information derived from the request includes a relationship to a term derived from the request.

15. A system for providing a self-learning semantic search engine, the system comprising:
    a database for storing business data related to an enterprise;
    a user input-output device coupled to the database;
    a processor responsive to inputs from the user input device and coupled to the database, the processor configured to:
        set up an initial configuration for a semantic network;
        build indexes and semantic indexes in a search engine coupled to the semantic network, wherein the indexes indicate terms included in the at least one document and the semantic indexes include at least one concept defining a semantic relation between at least two terms of the at least one document;
        receive a request for business data;
        update the indexes and semantic indexes, wherein the semantic indexes are updated by adjusting a ranking of an existing term based on context information derived from the request;
        retrieve a document from the search engine that matches the request;
        receive markups or bookmarks for the document; and
        update indexes and semantic indexes with the markups or bookmarks.

16. The system of claim 15, wherein the initial configuration for the semantic network is received from a user.

17. The system of claim 15, wherein the initial configuration for the semantic network is extracted from existing business objects.

18. The system of claim 15, wherein the semantic indexes includes at least one of: user preferences information based on user roles; synonyms for business terms based on user roles; indicators indicating importance of business terms based on user roles.

19. The system of claim 15, wherein the semantic dispatcher dispatches the request for business data based on user's business roles, semantic terminology and business objects assigned to the semantic terminology.

20. The system of claim 15, wherein the context information derived from the request includes a relationship to a term derived from the request.

* * * * *